(12) United States Patent
Wang

(10) Patent No.: US 7,932,929 B2
(45) Date of Patent: Apr. 26, 2011

(54) QUICK IMAGE CAPTURE SYSTEM

(75) Inventor: Chin-Yu Wang, Taipei (TW)

(73) Assignee: Pegatron Corporation, Taipei (TW)

( * ) Notice: Subject to any disclaimer, the term of this patent is extended or adjusted under 35 U.S.C. 154(b) by 521 days.

(21) Appl. No.: 12/068,294

(22) Filed: Feb. 5, 2008

(65) Prior Publication Data

US 2008/0231724 A1   Sep. 25, 2008

(30) Foreign Application Priority Data

Mar. 23, 2007  (TW) ............................... 96110241 A

(51) Int. Cl.
H04N 5/228 (2006.01)
H04N 5/222 (2006.01)
H04N 5/225 (2006.01)

(52) U.S. Cl. ................. 348/222.1; 348/333.13; 348/372

(58) Field of Classification Search ............... 348/231.9, 348/333.13, 372
See application file for complete search history.

(56) References Cited

U.S. PATENT DOCUMENTS

| | | | |
|---|---|---|---|
| 4,410,915 A * | 10/1983 | Yamamoto | 348/363 |
| 5,526,011 A * | 6/1996 | Hix et al. | 345/87 |
| 7,019,784 B1 | 3/2006 | Shibuya et al. | |
| 7,405,738 B2 * | 7/2008 | Mance et al. | 345/629 |
| 7,437,419 B2 * | 10/2008 | Tu et al. | 709/206 |
| 7,489,360 B2 * | 2/2009 | Miyata | 348/372 |
| 7,693,406 B2 * | 4/2010 | Nomura et al. | 396/55 |
| 2003/0076437 A1 * | 4/2003 | Karasaki et al. | 348/347 |
| 2003/0193600 A1 * | 10/2003 | Kitamura et al. | 348/333.01 |
| 2005/0114459 A1 | 5/2005 | Tu et al. | |
| 2006/0007327 A1 * | 1/2006 | Nakamura et al. | 348/239 |
| 2006/0007341 A1 * | 1/2006 | Nakamura et al. | 348/333.05 |

FOREIGN PATENT DOCUMENTS

| | | |
|---|---|---|
| CN | 1336586 A | 2/2002 |
| TW | 587735 Y | 5/2004 |
| TW | M283233 | 12/2005 |

* cited by examiner

*Primary Examiner* — Lin Ye
*Assistant Examiner* — Amy Hsu
(74) *Attorney, Agent, or Firm* — Muncy, Geissler, Olds & Lowe, PLLC

(57) ABSTRACT

A quick image capture system for a notebook computer able to capture the images while the notebook computer does not launch an operation system is described. The quick image capture system includes a hot key, a read-only memory, a central processing unit, a chip set, a random-access memory, a video module and a camera module. The read-only memory stores a driving software. When the hot key is triggered, the central processing unit reads the driving software from the read-only memory and executes the driving software so as to enable the video module, display and the camera module by the chip set.

18 Claims, 2 Drawing Sheets

QUICK IMAGE CAPTURE SYSTEM

RELATED APPLICATIONS

The present application is based on, and claims priority from, Taiwan Application Serial Number 96110241, filed Mar. 23, 2007, which is herein incorporated by reference.

FIELD OF THE INVENTION

The present invention generally relates to a quick image capture system. More particularly, this invention relates to a quick image capture system for an electronic device.

BACKGROUND OF THE INVENTION

With the fast development of digital image processing technology, digital cameras have become popular consumer electronic products. A digital camera has many advantages. For example, no film is needed in a digital camera, a large amount of image data can be stored in the digital camera, and the captured image can be instantly displayed after taking a picture. A digital camera has image processing functions, such as brightness adjustment and color adjustment. The image data can be stored digitally and be transferred through the Internet. The image data can also be recorded in an optical disk permanently.

Moreover, due to rapid developments in electrical technologies and portable computer applications, notebook computers are gradually becoming smaller and lighter with each passing day. Notebooks are portable and light thereby facilitating an enormous increase in productivity and making notebook computers popular electrical product.

Since notebook computers possess convenient portability and powerful calculation ability, notebook computers have become required equipment for most businessmen. In addition, to conveniently provide multimedia functions and further provide network video conferencing for businessmen, some notebook computers have embedded digital cameras. The conventional notebook computer with the embedded camera is operated by an operating system launched in the notebook computer to take pictures/video, and to store or transmit the pictures/video. However, the computer operating system, such as Microsoft Windows, has to consume a lot of energy and time to wait the notebook computer to become ready to use because an enormous operating system has to run first. The energy consumption reduces the operable working time for the conventional notebook computer.

In fact, sometimes users only turn on the computer to take or watch a single picture, or do it in a very short time. Therefore, there is a need to quickly and easily turn on the notebook computer to capture and store pictures with lower power consumption.

SUMMARY OF THE INVENTION

One object of the present invention is to provide an electronic device, such as a notebook computer, with an image capture function, which is able to control an image capture device embedded in the electronic device to take pictures or video without launching the operating system on the electronic device.

Another object of the present invention is to provide a notebook computer with an image capture function, which is able to control an image capture device embedded in the notebook computer to take pictures or video and store in the notebook computer without launching the operating system on the notebook computer.

To achieve these and other advantages and in accordance with the purpose of the present invention, as the embodiment broadly describes herein, the present invention provides a quick image capture system for an electronic device with an image capture function. The quick image capture system includes a hot key disposed on a surface of the electronic device, a read-only memory storing a basic input/output system (BIOS), driving software therein, a central processing unit, a chip set, a random-access memory, a video module, a display and a camera module.

When the hot key is triggered, the central processing unit reads the driving software from the read-only memory and executes the driving software to enable the video module, the display and the camera module through the chip set. The image data captured by the camera module are first stored in the random-access memory and the video module, e.g. a video graphics array module, reads the image data from the random-access memory to live display the image on the display.

When the hot key is not triggered, the central processing unit executes the basic input/output system (BIOS) of the notebook computer and launches an operating system, such as Microsoft Windows, for the notebook computer to control the notebook computer.

The hot key can be a single key or a combination of keys of a keyboard of the notebook computer. Alternatively, the hot key can be an independent switch and is electrically connected in parallel to a main power switch of the notebook computer to turn on the quick image capture system and the notebook computer. The hot key can also be triggered after the driving software is executed in a predetermined time to confirm whether a user requires turning on the quick image capture system.

The driving software is preferably able to execute part functionality of the basic input/output system of the notebook computer to enable the desired devices, e.g. a video module, a display and a camera module, of the notebook computer. The driving software can further drive a storage device, e.g. a hard disk, to store the image data captured by the camera module. The quick image capture system can further include an input device, composed of a single key or a combination of keys, and a user interface, e.g. a on screen display interface, for the user to control the quick image capture system. The input device can further include a turn off switch to effectively turn off the quick image capture system.

Another aspect of the present invention is to provide a quick image capture method to quick capture and/or store the image with the foregoing quick image capture system.

Hence, the quick image capture system and the quick image capture method can be applied to a notebook computer to take pictures/video and live display the pictures/video without launching the operating system of the notebook computer.

In cooperation with the hard disk of the notebook computer, the pictures and video can be stored on the hard disk. Because the notebook computer can quick capture the image with the quick image capture system, and without turning on all internal devices and launching the operating system of the notebook computer, the start-up time for the notebook computer is much shorter and power is saved. Accordingly, the quick image capture system and the quick image capture method according to the present invention can effectively extend the application field for the notebook computer and the operating time of the notebook computer when operating with the battery.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
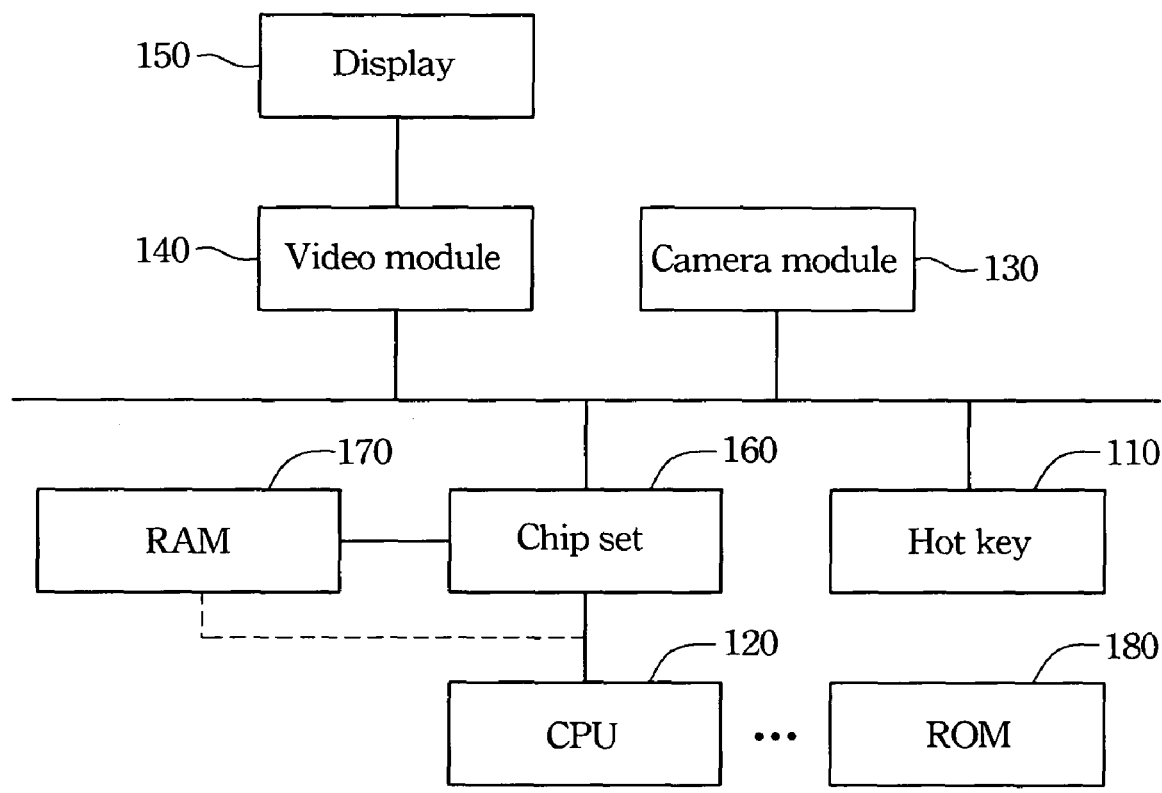
FIG. 1 illustrates a preferred embodiment of a quick image capture system according to the present invention.

FIG. 1 illustrates a preferred embodiment of a quick image capture system according to the present invention. The quick image capture system includes a hot key 11, preferably disposed on a surface of an electronic device with an image capture function, e.g. a surface of a notebook computer, a read-only memory 180 to store a driving software and a basic input/output system (BIOS) of the notebook computer, a central processing unit 120, a chip set 160, a random-access memory 170, a video module 140, a display 150 and a camera module 130.

In general, after the notebook computer is triggered, the central processing unit 120 loads a basic input/output system from the read-only memory 180 and an operating system, for example, Microsoft Windows, to control the notebook computer and execute the commands requested by the user.

If the hot key 110 of the notebook computer according to the present invention is triggered, the central processing unit 120 loads the driving software from the read-only memory 180 and executes the driving software to drive the video module 140, the display 150 and the camera module 130 through the chip set 160. At the moment, a picture/video taken by the camera module 130 can be stored in the random-access memory 170, and the video module 140, e.g. a video graphics array (VGA) module, can directly read the data of the picture/video from the random-access memory 170 to show the picture/video on the display 150.

The hot key 110 can be a key or a combination of keys selected from the keyboard of the notebook computer. Alternatively, the hot key 110 can be an independent key for the quick image capture system, and is parallel to connect with the main power switch of the notebook computer. Therefore, when the notebook computer is turned on and the hot key 110 is triggered, the notebook computer starts in the quick image capture mode. When the notebook computer is turned on and the hot key 110 is not triggered, the notebook computer starts in the normal mode with the operating system, such as the Microsoft Windows.

The driving software preferably has a part function of the basic input/output system of the notebook computer to enable some devices, e.g. the video module 140, the display 150 and the camera module 130, of the notebook computer. The driving software can further enable a storage device, for example, a hard disk, to store the pictures/video taken by the camera module 130 therein.

The quick image capture system according to the present invention can further include an input device, e.g. a single key or a combination of keys, and a user interface, e.g. an on screen display (OSD), to further control the functions of the quick image capture system.

The input device can also include a turn off key to effectively turn off the quick image capture system. Accordingly, the notebook computer with the quick image capture system according to the present invention can promptly take pictures/video with desired devices without launching the operating system of the notebook computer so as to effectively reduce the power consumption for taking pictures/video with the notebook computer and increase the available working time for the notebook computer provided by the electrical power by a battery.

Figure 2:
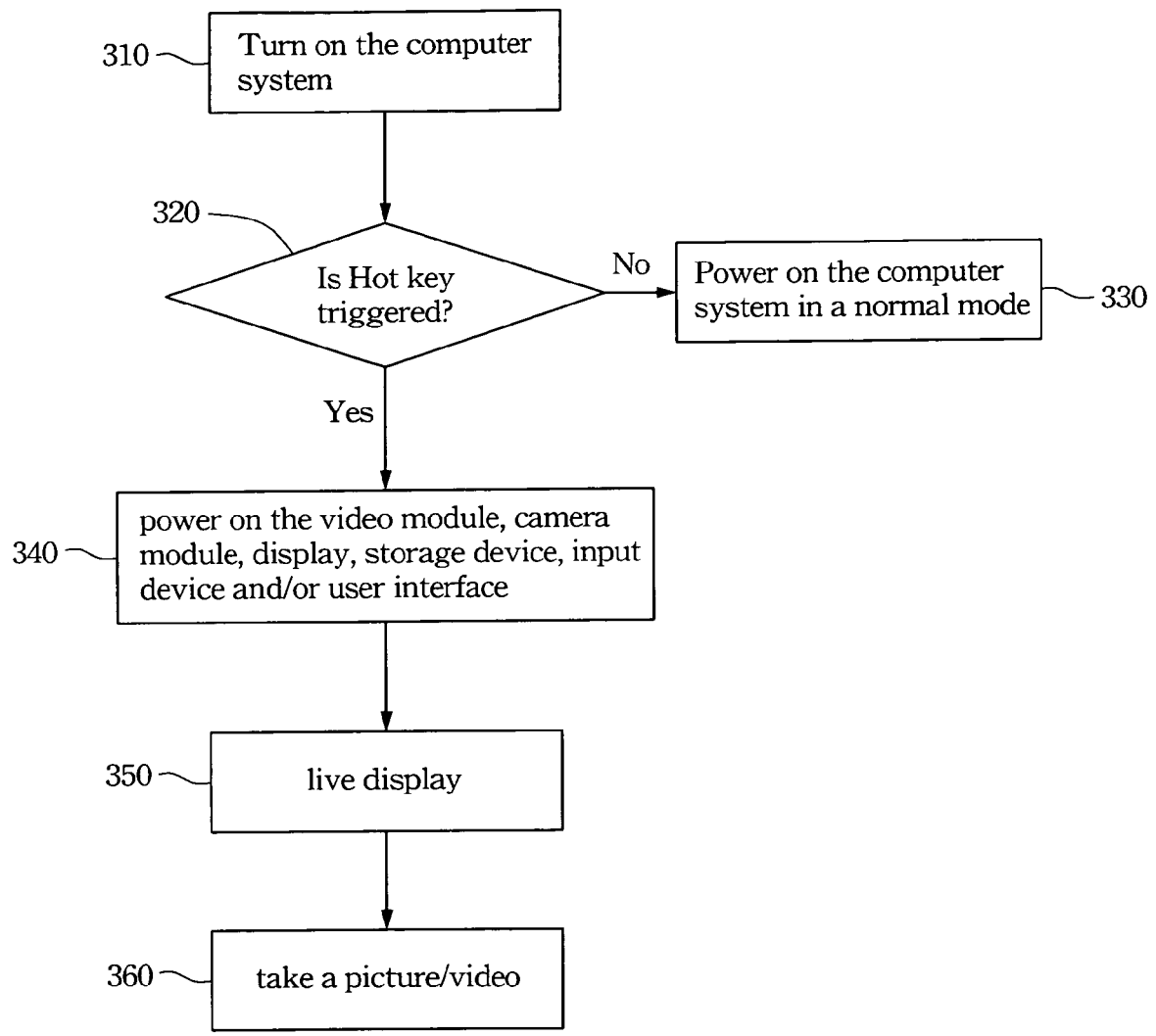
FIG. 2 is a control flowchart of a quick image capture system according to the present invention.

Refer to FIG. 2. FIG. 2 is a control flowchart of a quick image capture system according to the present invention. In step 310, a computer system, for example, a notebook computer, is turned on. Subsequently, the computer system determines whether the hot key is triggered or not in step 320. If the hot key is triggered, the computer system starts in the quick image capture mode as shown in step 340 and step 350. If the hot key is not triggered, the computer system starts in the normal mode with the operating system thereof in step 330.

Furthermore, an additional step can be added before step 320 to launch part functionality of the basic input/output system (BIOS) of the computer system and then wait a predetermined period for a user to trigger the hot key. If the hot key is not triggered after the predetermined period, the computer system launches the other part of the BIOS thereof. If the hot key is triggered in time, the computer system changes to the quick image capture mode, step 340.

The hot key can be a single key or a combination of keys selected from the keyboard of the computer system. Alternatively, the hot key can be an independent key for the quick image capture system, and is parallel to connect with the main power switch of the computer system to simultaneously trigger the computer system.

In step 340, the computer system turns on some internal devices, for example, a video module, a camera module and a display, according to a preset requirement. The computer system can further turns on a storage device, an input device and a user interface. Therefore, the computer system can take pictures or video according to the user's request. Turning to step 350, the display of the computer system can live display the pictures/video captured by the camera module. In step 360, the computer system can further take pictures/video if a user desires to keep the image shown on the display. When the storage device, e.g. a hard disk, is turned on, the pictures and video captured by the camera module can be stored therein.

Hence, the notebook computer with the quick image capture system according to the present invention can take pictures/video and live display the pictures/video without the operating system of the notebook computer. The pictures and video can further be stored in the hard disk of the notebook computer. Since the notebook computer can quick capture the image with the quick image capture system, and without turning on all internal devices and launching the operating system of the notebook computer, the notebook computer enables much more rapid start-up time and power savings. Therefore, the notebook computer with the quick image capture system according to the present invention can effectively extend the application field and the operating time with the battery.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A quick image capture system for a computer with an image capture function, comprising:
    a hot key disposed on a surface of the computer and electrically connected to a main power switch of the computer in parallel;
    a read-only memory storing a basic input/output system (BIOS) and a driving software, the driving software providing part functionality of a basic input/output system of the computer;
    a central processing unit electrically connected to the read-only memory;
    a chip set electrically connected to the central processing unit;
    a random-access memory electrically connected to chip set;
    a video module;
    a display; and
    a camera module, when the hot key is triggered, the central processing unit reads the driving software from the read-only memory and executes the driving software to enable the video module, the display and the camera module through the chip set so that image data captured by the camera module are stored in the random-access memory and live displayed on the display through the video module reading the image data from the random-access memory.

2. The quick image capture system of claim 1, wherein the hot key is a single key or a combination of keys of a keyboard of the computer.

3. The quick image capture system of claim 1, wherein the hot key is a switch to turn on the quick image capture system.

4. The quick image capture system of claim 1, further comprising a storage device driven by the driving software and the chip set to store the image data captured by the camera module.

5. The quick image capture system of claim 1, further comprising an input device electrically connected to the central processing unit, and driven by the driving software and the chip set.

6. The quick image capture system of claim 5, further comprising a user interface, wherein the quick image capture system is further controlled by the user interface and the input device.

7. The quick image capture system of claim 5, wherein the input device comprises a turn off key to turn off the quick image capture system.

8. The quick image capture system of claim 1, wherein the video module comprises a video graphics array (VGA) module of the computer.

9. The quick image capture system of claim 1, wherein an operating system of the computer is not executed by the central processing unit when the hot key is triggered.

10. The quick image capture system of claim 9, wherein the operating system is Microsoft Windows.

11. A quick image capture method for a computer with an image capture function, comprising:
    determining whether a hot key electrically connected to a main power of the computer in parallel on the computer is triggered;
    when the hot key is triggered, utilizing a central processing unit of the computer to read a driving software from a read-only memory of the computer, the driving software providing part functionality of a basic input/output system of the computer;
    enabling a video module, a display and a camera module through a chip set of the computer;
    storing data of an image captured by the camera module into a random-access memory;
    utilizing the video module to read the data of the image stored in the random-access memory; and
    displaying the image on the display.

12. The quick image capture method of claim 11, wherein an operating system of the computer is executed by the central processing unit when the hot key is not triggered and the computer is turned on.

13. The quick image capture method of claim 12, wherein the operating system is Microsoft Windows.

14. The quick image capture method of claim 11, further comprising:
    turning on the computer;
    executing part functionality of a basic input/output system of the electronic device; and
    waiting a predetermined period for the hot key to be triggered 15. The quick image capture method of claim 14, further comprising:
    further executing the other part functionality of the basic input/output system and an operating system of the computer when the hot key is not triggered in the predetermined period.

16. The quick image capture method of claim 14, wherein the hot key is triggered by pressing a single key or a combination of keys of a keyboard of the computer.

17. The quick image capture method of claim 11, wherein the steps of utilizing the video module to read the data of the image stored in the random-access memory and displaying the image on the display comprises utilizing a video graphics array (VGA) module of the computer to read the data of the image stored in the random-access memory and immediately displaying the image on the display.

18. The quick image capture method of claim 11, further comprising:
    enabling a hard disk through the chip set; and
    storing the data of the image into the hard disk.

* * * * *